United States Patent
Alarcon Ramos et al.

(10) Patent No.: US 9,721,128 B2
(45) Date of Patent: Aug. 1, 2017

(54) RADIO TAG

(71) Applicant: Commissariat a l'energie atomique et aux energies alternatives, Paris (FR)

(72) Inventors: Juvenal Alarcon Ramos, Grenoble (FR); Bernard Viala, Sassenage (FR)

(73) Assignee: Commissariat à l'énergie atomique et aux énergies alternatives, Paris (FR)

( * ) Notice: Subject to any disclaimer, the term of this patent is extended or adjusted under 35 U.S.C. 154(b) by 0 days.

(21) Appl. No.: 14/963,796

(22) Filed: Dec. 9, 2015

(65) Prior Publication Data
US 2016/0171261 A1    Jun. 16, 2016

(30) Foreign Application Priority Data
Dec. 11, 2014  (FR) ...................................... 14 62291

(51) Int. Cl.
*G06K 7/10*    (2006.01)
*G06K 19/07*   (2006.01)
*G01K 5/48*    (2006.01)

(52) U.S. Cl.
CPC ......... *G06K 7/10316* (2013.01); *G01K 5/483* (2013.01); *G06K 19/0717* (2013.01); *G06K 19/0724* (2013.01)

(58) Field of Classification Search
CPC combination set(s) only.
See application file for complete search history.

(56) References Cited

U.S. PATENT DOCUMENTS

| | | |
|---|---|---|
| 2004/0061655 A1 | 4/2004 | Forster et al. |
| 2008/0007253 A1 | 1/2008 | Takahata |
| 2010/0079288 A1 | 4/2010 | Collins et al. |

(Continued)

FOREIGN PATENT DOCUMENTS

| | | |
|---|---|---|
| JP | 2009-162700 A | 7/2009 |
| WO | WO 2005/112591 A2 | 12/2005 |

OTHER PUBLICATIONS

Rahul Bhattacharyya, et al., "Low-Cost, Ubiquitous RFID-Tag-Antenna-Based Sensing" Proceedings of the IEEE, vol. 98, No. 9, Sep. 2010, pp. 1593-1600 and Cover Page.

(Continued)

*Primary Examiner* — Kabir A Timory
(74) *Attorney, Agent, or Firm* — Oblon, McClelland, Maier & Neustadt, L.L.P.

(57) ABSTRACT

A radio tag capable of indicating to a reader, via a wireless link, that a variation in energy has crossed a predetermined threshold, this variation in energy being chosen from the group made up of a variation in the temperature of the radio tag and a variation in the magnetic field in which the radio tag is immersed. This radio tag includes transducer material chosen from a group made up of a thermal shape-memory material, a magnetostrictive material and a magnetic shape-memory material. This transducer material is deposited and affixed without any degree of freedom onto a substrate or an antenna of the radio tag to form, with the substrate or the antenna, a multilayer structure which flexurally deforms the antenna between a bent conformation and a less bent conformation when the energy variation crosses the predetermined threshold.

12 Claims, 1 Drawing Sheet

(56) References Cited

U.S. PATENT DOCUMENTS

2011/0121911 A1\* 5/2011 Kamata .................... H03C 1/36
332/149
2015/0108472 A1\* 4/2015 Suzawa ............. H01L 29/78648
257/43

OTHER PUBLICATIONS

Rahul Bhattacharyya, et al., "RFID Tag Antenna Based Temperature Sensing Using Shape Memory Polymer Actuation" Proceedings of the 2010 IEEE Sensors Conference, Nov. 2010, pp. 2363-2368 and Cover Page.
Rahul Bhattacharyya, et al., "RFID Tag Antenna Based Temperature Sensing in the Frequency Domain" 2011 IEEE International Conference on RFID, Apr. 2011, 8 Pages.
S. Caizzone, et al., "Multi-Chip RFID Antenna Integrating Shape-Memory Alloys for Detection of Thermal Thresholds" IEEE, 2011, 7 Pages.
S. Jacobs, et al., "Deployable auxetic shape memory alloy cellular antenna demonstrator: design, manufacturing and modal testing" IOP Publishing, Smart Materials and Structures, vol. 21, No. 7, 2012, 13 Pages.
Adnan Kaya, et al., "Radio Frequency U-Shape Slot Antenna Design With Niti Shape Memory Alloys" Microwave and Optical Technology Letters, vol. 55, No. 12, Dec. 2013, pp. 2976-2984.
Xin Lan, et al., "Design of a Deployable Antenna Actuated by Shape Memory Alloy Hinge" Materials Science Forum vols. 546-549, 2007, pp. 1567-1570.
Youbok Lee "Antenna Circuit Design for RFID Applications" Microchip Technology Inc., AN710, DS00710C, 2003, 50 Pages.

\* cited by examiner

RADIO TAG

BACKGROUND

(1) Field

The invention relates to a radio tag capable of indicating to a reader, via a wireless link, that a variation in energy has crossed a predetermined threshold, this variation in energy being chosen from the group consisting of a variation in the temperature of the radio tag and a variation in the magnetic field in which the radio tag is immersed. The invention also relates to an assembly comprising this radio tag and a reader.

(2) Description of the Related Art

Radio tags are also known as RFID (Radio Frequency Identification) tags.

Known radio tags comprise:
- an electrically insulating substrate,
- an antenna to set up the wireless link with the reader, this antenna being entirely deposited and affixed without any degree of freedom onto the insulating substrate, and
- an actuator capable of modifying the impedance of this antenna when the energy variation crosses the predetermined threshold in order to indicate this event to the reader, this actuator comprising a transducer material for this purpose capable of transforming the energy variation into a mechanical deformation, the transducer material being chosen from a group made up of a thermal shape-memory material, a magnetostrictive material and a magnetic shape-memory material.

For example, a radio tag of this type is disclosed in the following article: R. Bhattacharyya et al: "*RFID Tag Antenna Based Temperature Sensing in the Frequency Domain*", RFID, 2011, IEEE Conference on RFID. This article is referred to as article A1 in this description below.

Prior art is also known from: US2004/061655A1. US2008/007253 and US2010/079288A1.

In article A1, the actuator comprises a plate made from electrically conductive material affixed to an arm made from a thermal shape-memory material. In the description below, unless otherwise indicated, the term "shape-memory material" refers to a thermal shape-memory material, i.e. a material which is suddenly deformed when its temperature crosses a temperature threshold $S_T$. This temperature threshold is also referred to as the "transition temperature" of the material. For simplification, hysteresis phenomena are ignored here in such a way that the transition temperature is assumed to be the same when the shape-memory material is heated and when it is cooled.

When the temperature is less than the threshold $S_T$, the arm holds the plate in a position distanced from the antenna. In the distanced position, the plate is around 1 cm below the antenna. If the temperature of the radio tag exceeds the threshold $S_T$, the arm becomes deformed and moves the plate to a close position. In the close position, the plate is around 3 mm below the antenna. The presence or not of the plate close to the antenna modifies its impedance. The modification of the impedance of the antenna is detectable by the reader. The reader can thus know whether the temperature of the radio tag has or has not exceeded the threshold $S_T$.

Radio tags of this type that are capable of indicating whether a temperature threshold has been exceeded have many applications. For example, they can be used when they are affixed to a frozen product to check that the cold chain has been respected and that the temperature of the frozen product and therefore that of the radio tag has never exceeded the threshold $S_T$. Obviously, the field of application of radio tags of this type is not limited to frozen products. They can also be used on any object whose temperature must be monitored at one time or another.

In article A1, the antenna is simple to manufacture since it is entirely deposited onto the insulating substrate. Many manufacturing methods are then usable in order to manufacture it simply. For example, the antenna can be manufactured by depositing a conductive layer onto the substrate then by etching this conductive layer. The antenna can then be implemented through localised jetting of a conductive ink onto the substrate. In fact, in order to manufacture the actuator, a mobile plate and a mobile arm must be assembled in the same housing. Furthermore the vertical size of the actuator is relatively large due to the vertical movement of the plate.

A different embodiment of a radio tag of this type has been proposed in the following article: S. Caizzone et al: "*Multi-chip RFID Antenna Integrating Shape-memory Alloys for Detection of Thermal Thresholds*", IEEE 2011. However, this radio tag is also complex to implement since the manufacture of an electrical switch from shape-memory material is no simple matter, as the author of this article himself underlines.

A different possible embodiment is also disclosed in the application JP2009162700 from HITACHI®. In this patent application, the antenna comprises a part made from shape-memory material. This part of the antenna is unfolded and alternately folded up on itself. For this purpose, it is anchored, on one side, in a wall and is mounted in a cantilevered manner inside a cavity. Thus, in the application JP2009162700, the antenna is not entirely deposited onto an insulating substrate in such a way that the simple manufacturing methods normally used cannot be employed. Thus, as previously, this method of manufacturing the radio tag is complex to implement.

The prior art described above relates to radio tags capable of detecting the crossing of a temperature threshold $S_T$. However, the same production problems are encountered with a radio tag capable of detecting a variation in the magnetic field in which it is immersed.

BRIEF SUMMARY

The invention therefore intends to propose a radio tag that is simpler to manufacture. The subject matter is therefore a radio tag according to Claim 1.

The radio tag above preserves the simplicity of manufacture of the antenna since it involves an antenna deposited onto a substrate. Furthermore, in the claimed radio tag, the actuator which modifies the impedance of the antenna is much simpler to manufacture since, like the antenna, it involves a transducer material deposited onto the substrate. This transducer material can thus be deposited onto the substrate using the same methods as those used to manufacture the antenna. In particular, a material of this type can be deposited by bonding a wire onto the substrate, by photolithography and etching or by printing, for example using an inkjet printer.

Furthermore, in order to modify the impedance of the antenna, it is not necessary:
- to move a plate made from electrically conductive material between a close position and a distant position, or
- to implement a switch made from shape-memory material, or
- to implement a cantilevered antenna movable between an unfolded position and a folded-up position.

The claimed antenna thus enables detection of the crossing of a temperature threshold or a magnetic field threshold while remaining simple to manufacture.

The embodiments of this radio tag may comprise one or more of the characteristics of the dependent claims.

These embodiments of the radio tag furthermore offer the following advantages:

The fact that the transducer material also makes up at least a part of the antenna enables further simplification of the manufacture of this radio tag since the same transducer material performs the function of both the actuator and the antenna.

The fact that the entire antenna is made up from the transducer material simplifies the manufacture of the radio tag since it is not then necessary to provide electrical connections between this transducer material and a conductive track. In fact, such electrical connections between a transducer material and a simply conductive material are complex to implement and are often fragile.

The absence of an electronic chip in the radio tag enables further simplification of its manufacture.

The use of a shape-memory material as the transducer material enables the detection of a crossing of a temperature threshold.

The use of a transducer material whose deformation is irreversible furthermore enables the storage of the crossing of the predetermined threshold even in the absence of a reader.

The fact that the extent of the maximum clearance of the antenna between its bent and less bent conformations is at least greater than the thickness of the antenna simplifies the identification of these two conformations.

The subject-matter of the invention is also an assembly according to claim 10.

In the above assembly, the crossing of the predetermined threshold is coded by the frequency of the electromagnetic wave used to communicate with the reader. This means of coding the information according to which the predetermined threshold has or has not been crossed is independent from the distance separating the reader from the radio tag.

BRIEF DESCRIPTION OF THE DRAWINGS

The invention will be better understood from a reading of the description that follows, given purely by way of a non-limiting example and referring to the drawings, in which.

DETAILED DESCRIPTION

In these figures, the same references are used to denote the same elements. In this description below, the characteristics and functions well known to the person skilled in the art are not described in detail.

Figure 1:
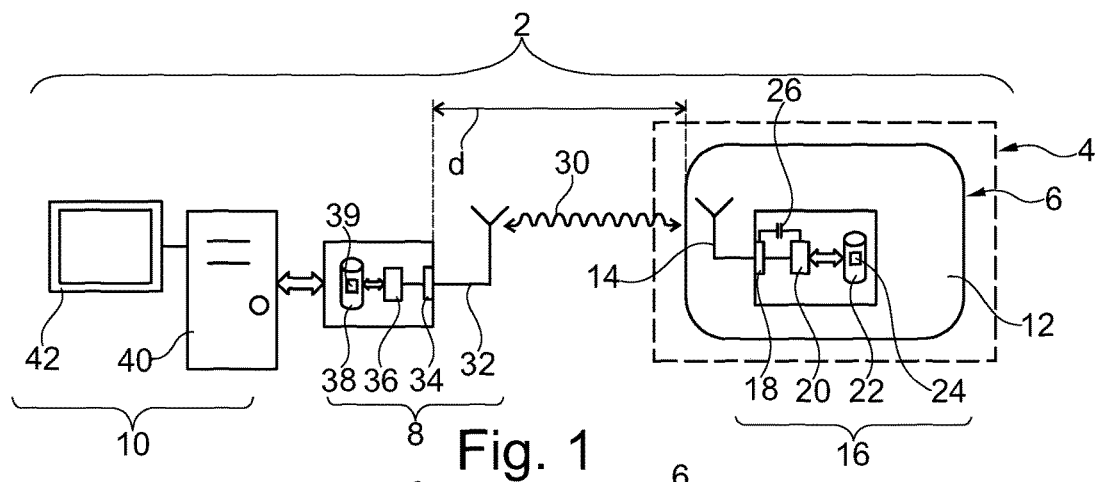
FIG. 1 shows schematically an assembly used to detect the crossing of a temperature threshold.

FIG. 1 shows an assembly 2 for detecting the crossing of a predetermined threshold $S_T$ by an energy variation chosen from the group consisting of a temperature variation and a magnetic field variation. In the particular case described here, the assembly 2 is used to detect a variation in temperature of an object 4. The object 4 is, for example, a packaging, a package, a living being or any other object to which a radio tag can be attached or affixed.

For this purpose, the assembly 2 comprises:
a radio tag 6 rigid with the object 4,
a reader 8 of the radio tag 6, and
a device 10 for processing the information read by the reader 8.

The radio tag 6 is affixed, for example, without any degree of freedom, to the object 4 if this object can become deformed and thus authorise the radio tag to become deformed. It is typically bonded to the object 4. It can also be integrated within the object 4 during its manufacture. It is also possible to affix this radio tag to the object 4 by way of a strap or collar. Is also possible for the radio tag to be affixed to the object 4 with a degree of freedom allowing it to become deformed. For example, only one end or one edge of the radio tag is affixed to the object 4.

The radio tag 6 includes:
a substrate 12 having an outer surface turned upwards,
an antenna 14 entirely deposited and affixed without any degree of freedom onto this outer surface of the substrate 12, and
an electronic chip 16 deposited and affixed without any degree of freedom directly onto the substrate 12.

In this embodiment, the outer surface is flat and horizontal while the temperature of the antenna 14 remains below the threshold $S_T$. The substrate 12 is made from an electrically insulating material. The term "electrically insulating material" refers to a material whose resistivity at 20° C. is greater than $10^6$ Ω·m and, preferably, greater than $10^{10}$ Ω·m.

The antenna 14 is shown schematically in FIG. 1. Possible example embodiments are described in more detail with reference to the following figures. The antenna 14 enables the reception and transmission of an electromagnetic wave. In the present case, it is designed to reflect, generally only a part, of an electromagnetic wave transmitted by the reader 8. The antenna 14 typically comprises an electrical track made from an electrically conductive material deposited directly onto the outer surface of the substrate 12. The term "electrically conductive material" refers here to a material whose resistivity is less than 1 Ω·m, preferably less than $10^{-3}$ or $10^{-5}$ than Ω·m. The antenna 14 is affixed without any degree of freedom onto the outer surface of the substrate 12.

Many methods are possible for implementing the antenna 14 on the outer surface of the substrate 12. For example, the antenna 14 is obtained by bonding a conductive wire or by depositing a layer made from an electrically conductive material onto this outer surface then by etching this layer. The antenna 14 can also be obtained through localised jetting of a conductive ink directly onto the outer surface of the substrate 12.

The electronic chip 16 comprises:
a transceiver 18 electrically connected to the antenna 14,
an electronic processor 20 capable of executing instructions recorded in a memory in order to process and transmit information, and
a non-volatile memory 22 comprising, for example, the instructions executed by the processor 20 and data such as a unique identifier 24.

The identifier 24 enables the unique identification of this radio tag 6 among the group of other radio tags likely to be read by the reader 8.

The transceiver 18 transforms at least a part of the electromagnetic wave captured by the antenna 14 into stored electrical energy, for example, in a capacitor 26. The capacitor 26 is integrated within the chip 16. When it exceeds a predetermined threshold, the electrical energy stored in this capacitor 26 is then used to feed the processor 20. The transceiver 18 also demodulates the received electromagnetic wave in order to transform the coded data in this electromagnetic wave into digital data transmitted to the processor 20. The modulation of the data transmitted to the radio tag 6 is, for example, an amplitude modulation or a phase modulation. Finally, the transceiver 18 is also capable of transmitting data to the reader 8, said data being transmitted to it in digital form by the processor 20. For example, the transceiver 18 modifies the input impedance of the chip 16 for this purpose according to the information bits to be transmitted. The modification of the input impedance of the chip 16 manifests itself as a modification of the reflection coefficient of the antenna 14. The value of the input impedance of the chip 16, is, for example, modified by modifying the value of a resistive load connected between terminals of the antenna 14. The amplitude of the electromagnetic wave reflected by the antenna 14 is thus modified according to the value of the bit or group of bits to be transmitted. This modification of the relationship between the amplitude of the electromagnetic wave transmitted by the reader 8 and the amplitude of the electromagnetic wave reflected by the antenna 14 is detected by the reader 8. On the basis of this difference in amplitudes, the reader extracts therefrom the value of the bit or group of bits transmitted by the radio tag. The part of the electromagnetic wave that is not reflected by the antenna 14 is typically used by the transceiver 18 to charge the capacitor 26. This protocol for communication between the radio tag 6 and the reader 8 is referred to a "retromodulation" or "backscattering". It enables the reader 8:
to communicate with the radio tag 6 via a wireless link 30, and, at the same time,
to feed the radio tag 6.

With this protocol, the link 30 can be set up with a radio tag located at a distance d from the reader. This distance d is typically greater than 2 cm, 10 cm, 1 m or 10 m. This distance d is generally also less than 50 m or 30 m.

The frequency $f_r$ of the electromagnetic wave used to set up the link 30 is often chosen from the group made up of the following frequencies:
the range of the frequencies between 860 MHz and 960 MHz for UHF (Ultra High Frequency) tags,
the 13.56 MHz frequency, and
the 125 kHz frequency.

For example, the radio tag 6 operates in the range of frequencies between 860 MHz and 960 MHz.

The radio tag 6 is a passive radio tag, i.e. it has no electrical energy source built into the radio tag. In other words, the radio tag 6 is supplied only from the energy captured by the antenna 14.

The reader 8 is capable of setting up the link 30 with the radio tag 6 and therefore of reading this radio tag 6. For this purpose, the reader comprises:
an antenna 32,
a radio transceiver 34 connected directly to the antenna 32,
an electronic programmable processor 36 capable of executing instructions recorded in a memory, and
a memory 38.

The memory 38 contains the instructions necessary for the reader 8 to be able to read the radio tag 6 and, in particular, to be able to detect that the temperature of the radio tag 6 has crossed the threshold $S_T$.

The reader 8 is, for example, identical to that described in article A1. Only the details necessary for the understanding of the invention are thus given here. The reader 8 is capable of automatically adjusting the frequency $f_r$ of the electromagnetic wave used to set up the link 30. More precisely, the reader 8 is capable of automatically selecting the frequency $f_r$ for which the rate $\tau$ of transfer of energy between the reader 8 and the radio tag 6 is greater than a predetermined limit $\alpha$. For example, the limit $\alpha$ is greater than or equal to 0.8 or 0.9. This rate $\tau$ is defined in chapter III of article A1. Its definition is therefore not repeated here. It will simply be restated that this rate $\tau$ is between 0 and 1 and that, for an electromagnetic wave received by the radio tag, the closer it is to 1, the greater the quantity of electrical energy that can be recovered by the radio tag from this electromagnetic wave. This rate $\tau$ depends on the input impedance of the chip 16 and the impedance of the antenna 14. For example, this rate $\tau$ is defined by the following relationship: $\tau = 4R_a R_c / |Z_a + Z|^2$, where:
$R_a$ and $R_c$ are the resistances of the antenna 14 and of the input impedance of the chip 16 respectively,
$Z_a$ and $Z_c$ are the impedances of the antenna 14 and of the input impedance of the chip 16.

When the rate $\tau$ is greater than the limit $\alpha$, the reader 8 can read a radio tag more distant from the reader or, for a given distance, can read this radio tag with a less powerful electromagnetic wave.

Here, as in article A1, in order to indicate to the reader 8 that the temperature of the radio tag has exceeded the threshold $S_T$, the impedance of the antenna 14 is modified. This manifests itself as a modification of the range of frequencies where the rate $\tau$ is greater than the limit $\alpha$. Here, the frequency range for which the rate is greater than the limit $\alpha$ when the temperature of the radio tag 6 is less than the threshold $S_T$ is denoted $[f_{CL}; f_{CH}]$. The frequency range for which the rate $\tau$ is greater than the limit $\alpha$ when the temperature of the radio tag is greater than the threshold $S_T$ is denoted $[f_{HL}; f_{HH}]$. Preferably, when the temperature of the radio tag 6 is less than the threshold $S_T$, outside the range $[f_{CL}; f_{CH}]$, the rate $\tau$ decreases very rapidly to be zero or almost zero. Similarly, when the temperature of the radio tag is greater than the threshold $S_T$, outside the range $[f_{HL}; f_{HH}]$, the rate $\tau$ decreases very rapidly also to be almost zero outside this range. Here, as described in more detail below, the modification of the impedance of the antenna 14 caused by the crossing of the threshold $S_T$ is sufficiently great so that no common frequency exists between the ranges $[f_{CL}; f_{CH}]$ and $[f_{HL}; f_{HH}]$. Thus, if the frequency chosen automatically by the reader 8 in order to read the radio tag 6 is within the range $[f_{CL}; f_{CH}]$, the reader 8 then infers automatically therefrom that the temperature of the radio tag has remained below the threshold $S_T$. Conversely, if the frequency automatically chosen by the reader 9 in order to read the radio tag 6 is in the range [$f_{HL}$; $f_{HH}$], the reader 8 then infers therefrom that the temperature of the radio tag 6 has exceeded the threshold $S_T$.

For this purpose, the reader 8 comprises in its memory a table 39 which associates the range [$f_{CL}$; $f_{CH}$] with an indication $t_C$ coding the fact that the temperature of the radio tag 6 is less than the threshold $S_T$. This table 39 also associates the range [$f_{HL}$, $f_{HH}$] with an indication $t_H$ which codes the fact that the temperature of the radio tag 6 has exceeded the threshold $S_T$.

It should be noted that, in this embodiment, although the radio tag 6 comprises a single chip 16 and a single antenna 14, the reader 8 is capable of reading this chip not only in the case where its temperature is lower but also in the case where its temperature is higher than the threshold $S_T$. The reader 8 can thus read its identifier 24, regardless of the temperature of the radio tag 6.

The reader 8 is connected to the device 10 in order to transmit to it the data read from the radio tag 6. For example, the reader 8 transmits to the device 10 the identifier 24 read from the radio tag 6 and also the indication $t_C$ or $t_H$ inferred from the frequency $f_r$ used to read the radio tag 6.

For example, the device 10 is equipped with a central unit 40 and a screen 42 in order to display the data read from the radio tag 6 on this screen in a manner directly readable and understandable by a human being.

Figure 2:
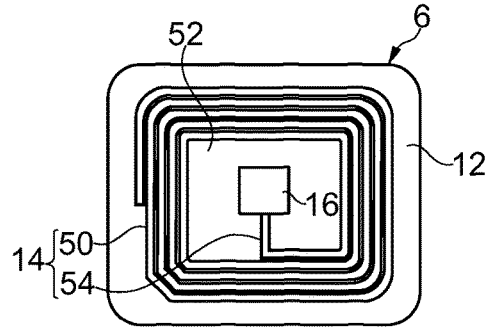
FIG. 2 shows a perspective view of a first embodiment of the radio tag of the assembly shown in FIG. 1.

The radio tag 6 includes an actuator which modifies the inductance of the antenna 14 in response to the crossing of the threshold $S_T$ by the temperature of this radio tag. To do this, this actuator flexurally deforms the antenna 14 between a less bent conformation, shown in FIGS. 2 and 3, and a bent conformation shown in FIGS. 4 and 5. In its less bent conformation, the substrate 12 and the antenna 14 extend horizontally. In this embodiment, the deformation between the bent and less bent conformations is reversible. Thus, if the temperature of the radio tag 6 falls back below the threshold $S_T$, the antenna 14 returns to the less bent conformation.

A first embodiment of the antenna 14 and of this actuator will now be described with reference to FIGS. 2 to 5. The antenna 14 has a self-inductance typically greater than 0.5 μH and preferably greater than 1 μH in both its less bent conformation and its bent conformation. The antenna 14 is spiral-shaped here for this purpose. More precisely, it comprises an electrical track 50 which is wound around a vertical central axis while moving progressively away from this central axis. The track 50 makes a plurality of full turns around this central axis to form a plurality of windings. The number of turns is set so that the self-inductance of the antenna 14 is greater than the aforementioned predetermined threshold.

The track 50 is conventionally wound around a central space 52. This central space 52 has, for example, a surface area, in a horizontal plane, greater than 1 cm² or 2 cm² and generally less than 25 cm² or 10 cm². The chip 16 is affixed to the substrate 12 inside this central space 52. Furthermore, the horizontal rectangle having the smaller surface area which contains entirely the track 50 has, for example, a surface area of less than 30 cm² or 25 cm², and preferably a surface area of less than 5 cm² or 3 cm². The number of turns of the antenna 14 is often greater than 2, 4 or 5.

The antenna 14 also comprises a rectilinear strand 54 connected directly, on one side, to the transceiver 18, and, on the other side, to the inside end of the track 50. Here, this strand 54 is a rectilinear elongation of the track 50.

Figure 3:
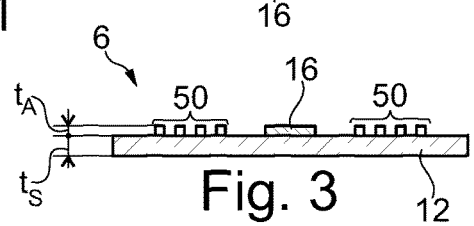
FIG. 3 shows a vertical cross section of the radio tag shown in FIG. 2.
Figure 4:
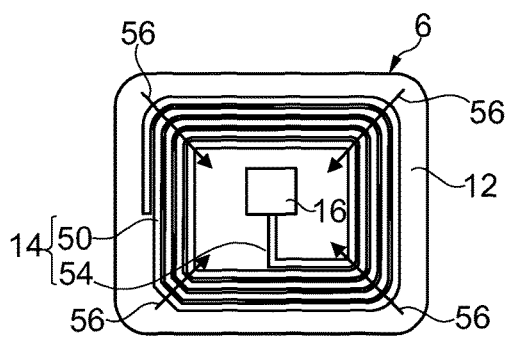
FIG. 4 shows a perspective view of the tag shown in FIG. 2 in a bent conformation.

The width of the track 50, in a horizontal direction, is generally between 100 μm and 2 mm. The thickness $t_A$ of the track 50, in a vertical direction, is generally between 1 μm and 500 μm. In FIG. 3, $t_S$, denotes the thickness of the substrate 12. Here, the thickness $t_S$ is constant and is, for example, between 100 μm and 5 mm.

In this embodiment, in its bent conformation, the substrate 12 and the antenna 14 are curved upwards, i.e. the edges of the substrate 12 rise upwards. Here, upwards and downwards are defined in relation to the vertical direction.

Figure 5:
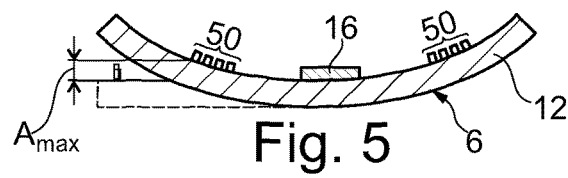
FIG. 5 shows schematically a vertical cross section of the radio tag shown in FIG. 4.

The maximum clearance of the antenna 14 between its less bent and bent conformations is denoted $A_{max}$ in FIG. 5. In this FIG. 5, the dotted lines represent the less bent conformation of the antenna 14. Here, this clearance $A_{max}$ is at least greater than the thickness $t_A$ of the antenna 14 and preferably at least 10 or 20 or 100 times greater than the thickness $t_A$. The clearance of the antenna 14 between its less bent and bent conformations modifies the inter-spiral distance of the orthogonal projection of the track 50 on a horizontal plane. In the case described here, this inter-spiral distance decreases in the transition from the less bent conformation to the more bent conformation.

This manifests itself as a substantial modification of the inductance of the antenna 14. It is assumed here that a modification of the self-inductance of the antenna 14 is substantial when the inductance varies by more than 10%, and preferably by more than 20% or 30%, in relation to the value of the inductance of the antenna in its less bent conformation. It is this modification of the inductance of the antenna 14 which manifests itself as the existence of the two distinct ranges [$f_{CL}$; $f_{CH}$] and [$f_{HL}$; $f_{HH}$];

In this embodiment, the actuator which moves the antenna 14 between its less bent and bent conformations is obtained by making the track 50 from a transducer material which transforms the temperature variation of the radio tag 6 when it crosses the threshold $S_T$ into an abrupt mechanical deformation of the track 50. Here, when the temperature of the radio tag 6 exceeds the threshold $S_T$, the track 50 contracts abruptly. For this purpose, the transducer material used to implement the track 50 is a shape-memory material. A shape-memory material refers here to a material whose lengthening rate is greater than 1% or 2% in response to a temperature variation typically of at least 2° C. and, for example, 5° C. or 10° C. or 20° C. The lengthening rate is the ratio ΔL/L between the amplitude ΔL of the deformation measured along the axis where this deformation is maximum and the length L of this material measured along the same axis. This substantial variation in the length of the shape-memory material is obtained when its transition temperature is exceeded. Here, the shape-memory material is chosen so that its transition temperature is equal to the threshold $S_T$ to within more or less 5° C. or to within more or less 1° C. It should also be noted that a shape-memory material typically contracts abruptly when its temperature exceeds its transition temperature. In other words, it reveals a behaviour opposite to that obtained through a simple thermal expansion. This contraction of the shape-memory material is shown by arrows 56 in FIG. 4 which point towards the central space 52.

In this embodiment, the chosen shape-memory material is also an electrically conductive material. This typically involves a shape-memory alloy. Thus, the same track 50 performs both the actuator function and the antenna function.

The track 50 is entirely affixed with no degree of freedom and permanently to the outer surface of the substrate 12. In particular, the track 50 remains continuously affixed to the substrate 12 during its entire deformation. With the substrate 12, it thus forms a multilayer structure that twists flexurally when the shape-memory material contracts. This structure therefore acts as a bimetallic strip. So that the size $A_{max}$ of the clearance is greater than the aforementioned threshold, the bending rigidity of the track 50 must therefore be adjusted appropriately in relation to the bending rigidity of the substrate 12. In order to adjust the rigidity of the track 50 and of the substrate 12, it is possible to vary the choice of materials used to implement them and/or their thickness. Bending rigidity refers below to the product of the Young's modulus at 25° C. and its thickness. Bending rigidity is also referred to as "flexural rigidity" or "flexural resistance". Here, in order to obtain the desired clearance $A_{max}$, the materials and their thickness are chosen in such a way as to verify the following relationship $E_A \cdot t_A > \beta E_S \cdot t_S$, where:

- $E_A$ and $t_A$ are the Young's modulus and the thickness of the antenna 14 respectively,
- $E_S$ and $t_S$ are the Young's modulus of the substrate 12 and its thickness respectively, and
- $\beta$ is a constant strictly greater than 1 and preferably greater than 10, 20 or 100.

For example, the shape-memory material used here is Nitinol which is a nickel and titanium alloy, the Young's modulus of which at 25° C. is typically greater than 150 GPa. Conversely, the substrate 12 is, for example, a polymer such as polyethylene naphthalene (PEN). Polyethylene terephthalate (PEN) or plexiglass, the thickness of which is between 200 μm and 2 mm. The Young's modulus of plexiglass at 25° C. is typically equal to 3 GPa.

If the radio tag 6 comprises layers of material other than the substrate 12 and the antenna 14, the bending rigidity of these other layers is, for example, chosen as much lower than the bending rigidity of the shape-memory material. The term "much lower" refers to the fact that the bending rigidity of these other layers is 100 or 1000 times lower than the bending rigidity of the track 50. By way of illustration, an additional layer may be a layer of varnish deposited onto the outer surface of the substrate 12 and the antenna in order to protect this antenna 14 against corrosion from the external environment.

The operation of the radio tag 6 can be inferred from the explanations given above.

Figure 6:
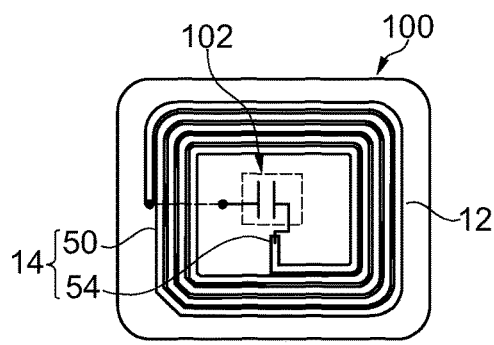
FIG. 6 shows schematically, in a perspective view, a second embodiment of a radio tag for the assembly shown in FIG. 1.

FIG. 6 shows a radio tag 100 likely to be used instead of the radio tag 6 in the assembly 2. It is identical to the radio tag 6 except that the chip 16 is replaced with a simple electrical load 102 electrically connected between the two ends of the antenna 14. In FIG. 6, the dotted-line track which electrically connects one terminal of the load 102 to the outer end of the antenna 14 indicates that this track is, for example, implemented on the surface of the substrate 12 opposite the outer surface. In this embodiment, the load 102 is a capacitor which, together with the antenna 14, forms a resonant circuit LC. The circuit LC thus formed resonates at a resonant frequency $f_{R1}$ when the antenna 14 is in its less bent conformation, and at a frequency $f_{R2}$ in its bent conformation. The capacitance of the capacitor 102 and the value of the self-inductance of the antenna 14 are adjusted so that the frequencies $f_{R1}$ and $f_{R2}$ coincide with frequencies that the reader 8 is capable of transmitting. Under these conditions, when the antenna 14 is in its less bent conformation, the rate τ is maximum for an electromagnetic wave transmitted at the frequency $f_{R1}$. Conversely, when the antenna 14 is in its bent conformation, the rate τ is maximum for an electromagnetic wave transmitted at the frequency $f_{R2}$.

The reader 8 is therefore capable of reading the information according to which the threshold $S_T$ is or is not exceeded in the same way as with the radio tag 6. However, no electronic chip is used in this simplified embodiment. Consequently, the identifier 24 of the radio tag is not transmitted to the reader 8.

Figure 7:
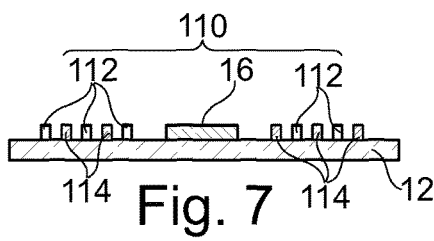
FIG. 7 shows schematically, in a vertical cross section view, a third embodiment of a radio tag for the assembly shown in FIG. 1.

FIG. 7 shows a radio tag 110 likely to be used instead of the radio tag 6 in the assembly 2. This radio tag 110 is identical to the radio tag 6 except that the antenna 14 is replaced with an antenna 112. The antenna 112 is not made from a shape-memory material or from a magnetostrictive material. The antenna 112 is, for example, a simple track made from conductive material such as copper. For example, the antenna 112 has the same shape as the antenna 14. Moreover, the radio tag 110 comprises, as an actuator, a strip 114 made from shape-memory material entirely deposited and affixed without any degree of freedom to the outer surface of the substrate 12. The strip 114 remains continuously affixed to the substrate 12 both before and after having contracted. The strip 114, along with the substrate 12, therefore forms a multilayer structure which deforms flexurally in response to a temperature variation. In this embodiment, the strip 114 is electrically isolated from the antenna 112. For example, the strip 114 is also wound around the chip 16. Here, it is a fixed to the outer surface of the substrate 12 in the space located between the spirals of the antenna 112.

In the embodiment shown in FIG. 7, the shape-memory material used does not also need to be an electrically conductive material. For example, the strip 114 is made from a shape-memory polymer such as that described in article A1.

Figure 8:
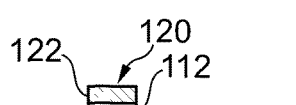
FIG. 8 shows schematically, in a partial vertical cross section view, a detail of a fourth embodiment of a radio tag for the assembly shown in FIG. 1.

FIG. 8 shows a radio tag 120 identical to the radio tag 110 except that the strip 114 is replaced with a strip 122. The strip 122 is identical to the strip 114 except that it is directly deposited and affixed without any degree of freedom, not onto the substrate 12 but onto the antenna 112.

Figure 9:
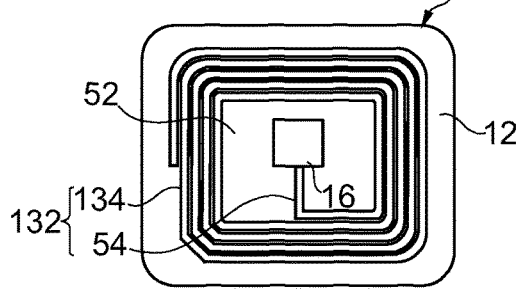
FIG. 9 shows a perspective view of a fifth embodiment of a radio tag for the assembly shown in FIG. 1.

FIG. 9 shows a radio tag 130 identical to the radio tag 6 except that the antenna 14 is replaced with an antenna 132. The antenna 132 is identical to the antenna 14 except that the track 50 is replaced with a track 134. This track 134 is identical to the track 50 except that it is made from a magnetostrictive material or magnetic shape-memory material and not from a thermal shape-memory material.

Here, the term "magnetostrictive material" refers to a material of which the absolute value of the coefficient of magnetostriction $\lambda_S$ on saturation is greater than 10 ppm (parts per million) and preferably greater than 100 or 1000 ppm. The coefficient $\lambda_S$ is defined by the following relationship $\lambda_S = \Delta L/L$, where $\Delta L$ is the amplitude of the deformation of the magnetostrictive material along the direction where its deformation is maximum and L is the length of this material in this direction in the absence of a magnetic field. For example, the magnetostrictive material is Terfenol-D or an FeSiB alloy or FeCo alloy. In this case, the coefficient of magnetostriction $\lambda_S$ of this material is strictly positive. The magnetostrictive material may also have a negative coefficient of magnetostriction $\lambda_S$. For example, in this case, the magnetostrictive material is SamFeNol, which is a samarium alloy.

A magnetic shape-memory material is a material which operates as described for the thermal shape-memory materials except that its deformation is triggered by a variation in the magnetic field and not by a temperature variation. As with the thermal shape-memory materials, the magnetic shape-memory material has a lengthening rate greater than 1% or 2%. For example, it may involve an NiMnGa alloy.

The radio tag 130 operates in the same way as the radio tag 6 except that it is a variation in the amplitude of the magnetic field created, for example, by a magnet, a coil or any other external magnetic field source to which the radio tag 130 is exposed which causes the impedance of the antenna 132 to vary.

Many other embodiments are possible. For example, the radio tag may comprise a battery or an additional energy recovery system and may therefore behave in the same way as a semi-passive or active radio tag.

Other shapes of the antenna 14 are possible. For example, the antenna may also be meander-shaped. In this case, the antenna extends along a longitudinal axis of the outer surface of the substrate and comprises a plurality of strands disposed one after the other along this longitudinal axis. Each of these strands forms a, for example rectilinear, segment which intersects the longitudinal axis at a single point. These strands are electrically interconnected by other strands located entirely on one side of this longitudinal axis. An antenna with a meander conformation is, for example, shown in article A1. The antenna may also have a "T" conformation as described in article A1. "Slot" versions of these antennas can also be used, these antennas then being characterised by an absence of material ("slot") locally in the metal that makes up the antenna.

The arrangement of the chip 16 may be different. For example, the transceiver 18 may be integrated within the processor 20.

In a different embodiment, the electrical load 102 is replaced with a resistor. It may also be replaced with a simple wired link. In this case, the reader 8 detects the modification of the mutual inductance between the antenna 32 and the antenna 14 in order to detect whether a temperature threshold $S_T$ has or has not been crossed.

Many other embodiments of the actuator are possible. For example, a plurality of different shape-memory materials can be used to implement different parts of the antenna. These shape-memory materials then each have a transition temperature different from the other shape-memory materials used. For example, a first part of the antenna is made from a first shape-memory material having a transition temperature $T_1$ and another part of the antenna is made from a second shape-memory material having a transition temperature $T_2$ greater than the temperature $T_1$. Under these conditions, if the temperature of the antenna is less than the temperature $T_1$, this corresponds to a first conformation of the antenna and therefore to a first value of the impedance of the antenna. If the temperature of the antenna is between the temperatures $T_1$ and $T_2$, the antenna bends to attain a second conformation of the antenna and therefore a second value of the impedance of this antenna. Finally, if the temperature of the antenna exceeds the temperature $T_2$, the antenna bends, for example even more, to attain a third conformation of the antenna in which it has a third inductance value. The reader 8 can detect what the current value of the inductance of the antenna is and can therefore determine the temperature range of the antenna. The use of different shape-memory materials thus enables detection of the crossing of a plurality of temperature thresholds.

In a different embodiment, the substrate and the antenna are each made from a different shape-memory material, i.e. shape-memory materials having different transition temperatures. This embodiment thus enables detection of the crossing of two different temperature thresholds.

In a further different embodiment, it is also possible to affix to the substrate 12, in addition to the strip 114, a different strip made from a shape-memory material having a transition temperature different from that of the strip 114. The crossing of two different temperature thresholds can thus be detected.

As a variant, only one part of the antenna 14 is made from the shape-memory material. The remainder of the antenna is then made from a conductive material having no shape-memory material properties.

In a different variant, the substrate 12 in the less bent conformation does not extend in a plane. For example, in the less bent conformation, the substrate 12 may already be curved as shown in FIG. 5. In this case, in the bent conformation, it is, for example, even more curved.

In a different variant, the antenna 14 is in its bent conformation when the temperature of the radio tag is less than the threshold $S_T$ and in its less bent conformation when the temperature of the radio tag is greater than this threshold $S_T$. For this purpose, the substrate 12 is, for example, curved on the side opposite that shown in FIG. 5 in the absence of any constraint imposed by the antenna 14. Under these conditions, the contraction of the antenna 14 when its temperature exceeds the threshold $S_T$ returns the substrate 12 and therefore the antenna 14 to a less bent conformation.

The strand 54 may also be made from a shape-memory material.

The shape-memory material used may be arranged in such a way that the deformation between the less bent conformation and the more bent conformation is irreversible. The method described in article A1 can be followed for this purpose.

The strip 114 may also be affixed differently to the substrate 12. For example, it may be deposited onto the rear surface of the substrate 12 located on the side opposite the surface to which the antenna 112 is affixed. The strip 114 does not then need to be spiral-shaped. For example, the strip 114 is a square layer made from shape-memory material whose surface area is equal to that of the antenna 112 to within more or less 10% or more or less 30% and which is bonded to the rear surface of the substrate 12 facing this antenna 112.

Other modulation methods can be used to transmit data between the reader and the radio tag. For example, the antenna 14 is electrically connected to a variable capacitor to form a resonant circuit LC. The transceiver 18 modifies the value of this capacitor according to the value of the bit or group of bits to be transmitted. This then modifies the value of the resonant frequency of the circuit LC. The reader detects this modification of the resonant frequency of the circuit LC and deduces the value of the transmitted bit or group of bits therefrom. This communication protocol operates particularly well when the antennas of the reader and of the radio tag are coupled through magnetic induction. This protocol is then generally used in the near field, i.e. when the antennas 14 and 32 are separated by a distance of less than $\lambda/(2\pi)$, where:

λ is the wavelength of the electromagnetic wave used to communicate between these antennas, and π is the number Pi.

In a different variant, it is the inductance of the antenna that is modified by the transceiver 18. To do this, the transceiver 18 controls an electrical switch that modifies the inductance of the antenna. These two embodiments are, for example, described in detail on page 21 of the following article: Youbok Lee: "Antenna Circuit Design for RFID Applications", Microchip Technology INC, 2003, Technical Note AN710.

The crossing of the threshold $S_T$ can also be detected by the reader 8 simply by the fact that it does not succeed in setting up the link 30 with the radio tag when the latter is located at a distance where, in the absence of modification of the inductance of the antenna, the link 30 could have been set up. For example, the radio tag is systematically placed for this purpose beyond a minimum distance between the reader and the radio tag and within a maximum distance beyond which the reader cannot normally set up the link 30 with this radio tag. Under these conditions, when the temperature is below the threshold $S_T$, the reader 8 succeeds in setting up the link 30 with the radio tag 6. In the opposite case, i.e. if the temperature has exceeded the threshold $S_T$, the reader does not succeed in setting up the link 30, which indicates to it that the temperature of the radio tag 6 has crossed the threshold $S_T$. In this simplified embodiment, it is not necessary for the reader to be capable of automatically choosing the frequency for which the transfer rate $\tau$ is greater than the limit $\alpha$. In this case, the reading frequency of the radio tag is typically set once and for all.

All the embodiments and variants previously described also apply to the case where the transducer material used is a magnetostrictive material or a magnetic shape-memory material.

The invention claimed is:

1. A radio tag capable of indicating to a reader, via a wireless link, that a variation in energy has crossed a predetermined threshold, the variation in energy being chosen from a group consisting of a variation in a temperature of the radio tag and a variation in a magnetic field in which the radio tag is immersed, the radio tag comprising:
   an electrically insulating substrate,
   an antenna to set up the wireless link with the reader, the antenna being entirely deposited and affixed onto the insulating substrate, and
   an actuator capable of modifying an impedance of the antenna when the energy variation crosses the predetermined threshold in order to inform to the reader, the actuator comprising a transducer material capable of transforming the energy variation into a mechanical deformation, the transducer material being chosen from a group consisting of a thermal shape-memory material, a magnetostrictive material and a magnetic shape-memory material,
   wherein the transducer material is deposited and affixed onto the substrate or the antenna to form, with the substrate or the antenna, a multilayer structure which flexurally deforms the antenna between a bent conformation and a less bent conformation when the energy variation crosses the predetermined threshold.

2. The radio tag according to claim 1, in which the transducer material is also an electrically conductive material and also makes up at least a part of the antenna in such a way as to perform a function of both the antenna and the actuator.

3. The radio tag according to claim 2, in which the entire antenna is made from the transducer material.

4. The radio tag according to claim 1, in which:
   two ends of the antenna are electrically interconnected either directly via an electrical track or via an electrical load to form a closed electrical circuit, and
   the radio tag has no electronic chip electrically connected to the closed electrical circuit.

5. The radio tag according to claim 1, in which the transducer material is a thermal shape-memory material whose lengthening rate is greater than 1% in response to a temperature variation of 10° C. around the predetermined threshold.

6. The radio tag according to claim 1, in which the transducer material is arranged in such a way that its deformation between its bent and less bent conformations is irreversible.

7. The radio tag according to claim 1, in which the extent of a maximum clearance of the antenna between its bent and less bent conformations is greater than a thickness of the antenna.

8. The radio tag according to claim 1, in which the radio tag is a passive radio tag fed only from the energy of the electromagnetic waves transmitted by the reader.

9. The radio tag according to claim 1, in which two ends of the antenna are electrically interconnected via a capacitor in order to form a resonant circuit LC whose resonant frequency is a function of the inductance of the antenna.

10. An assembly comprising:
    the radio tag according to claim 1, in which the deformation of the transducer material is capable of causing a frequency range for which a rate of transfer of electrical energy between a reader and the radio tag is greater than a predetermined limit to vary from a first range to a second range in response to the crossing of the predetermined threshold by the energy variation, these first and second frequency ranges having no common frequency, and
    the reader capable of transmitting an electromagnetic wave at an interrogation frequency in order to read the radio tag, the reader being capable of choosing automatically the interrogation frequency to be used so that a rate of transfer of electrical energy between the reader and the radio tag is greater than the predetermined limit, the reader furthermore comprising a pre-recorded table which associates indications of non-crossing and crossing of the predetermined threshold with the first and second frequency ranges respectively, and the reader is capable of transmitting to an external device the indication that is associated, by the pre-recorded table, with the interrogation frequency automatically chosen and used to interrogate the radio tag.

11. The radio tag according to claim 1, wherein the antenna is entirely deposited and affixed without any degree of freedom onto the insulating substrate.

12. The radio tag according to claim 1, wherein the transducer material is deposited and affixed without any degree of freedom onto the substrate or the antenna.

* * * * *

UNITED STATES PATENT AND TRADEMARK OFFICE
CERTIFICATE OF CORRECTION

PATENT NO. : 9,721,128 B2
APPLICATION NO. : 14/963796
DATED : August 1, 2017
INVENTOR(S) : Juvenal Alarcon Ramos et al.

Page 1 of 1

It is certified that error appears in the above-identified patent and that said Letters Patent is hereby corrected as shown below:

Column 6, Line 66, change "Conversely, if the frequency automatically chosen by the reader 9" to --Conversely, if the frequency automatically chosen by the reader 8--.

Signed and Sealed this
Tenth Day of April, 2018

Andrei Iancu
*Director of the United States Patent and Trademark Office*